United States Patent [19]

Yoshimura et al.

[11] 4,298,279

[45] Nov. 3, 1981

[54] COPYING APPARATUS HAVING AN ORIGINAL FEEDING MECHANISM

[75] Inventors: Shigeru Yoshimura, Yokohama; Akihiro Nomura, Kawasaki; Kimiaki Hayakawa, Tokyo, all of Japan

[73] Assignee: Canon Kabushiki Kaisha, Tokyo, Japan

[21] Appl. No.: 151,675

[22] Filed: May 20, 1980

[30] Foreign Application Priority Data

| | | | |
|---|---|---|---|
| Jun. 1, 1979 | [JP] | Japan | 54-68563 |
| Jun. 8, 1979 | [JP] | Japan | 54-72610 |
| Jun. 26, 1979 | [JP] | Japan | 54-80306 |
| Jun. 27, 1979 | [JP] | Japan | 54-82084 |
| Jun. 28, 1979 | [JP] | Japan | 54-82472 |

[51] Int. Cl.³ .............................................. G03B 15/00

[52] U.S. Cl. ................................ 355/133; 355/3 CH; 355/8; 361/214; 361/221

[58] Field of Search ............. 355/133, 3 CH, 8, 3 SH, 355/3 R; 250/324–326; 361/212, 214, 221; 271/208

[56] References Cited

U.S. PATENT DOCUMENTS 3,757,164 9/1973 Binkowski ........................ 355/3 CH 3,867,027 2/1975 Weigl .............................. 361/214 X

OTHER PUBLICATIONS

*Xerox Disclosure Journal,* "Static Eliminator", vol. 2, No. 6, Nov. 77, p. 81.

*Primary Examiner*—Richard L. Moses

*Attorney, Agent, or Firm*—Fitzpatrick, Cella, Harper & Scinto

[57] ABSTRACT

This specification discloses a copying apparatus having an original feeding mechanism for feeding originals by moving the originals on the surface of an original supporting member, characterized in that discharging means acts on the original supporting member from that side thereof opposite to the original supporting side of the original supporting member to discharge the original supporting surface.

5 Claims, 2 Drawing Figures

COPYING APPARATUS HAVING AN ORIGINAL FEEDING MECHANISM

BACKGROUND OF THE INVENTION

1. Field of the Invention

This invention relates to a copying apparatus having an original feeding mechanism, and more particularly to a copying apparatus having an original feeding mechanism in which electrostatic adherence force caused by friction charging during the feeding of originals is reduced to ensure smooth feeding of the originals.

2. Description of the Prior Art

In a copying apparatus having an original feeding mechanism of this type, originals are slidingly conveyed on the surface of an original supporting member (usually a glass surface) by means of a roller group or a conveyor belt and therefore, the friction between the originals and the surface of the original supporting member causes friction charging and thereby produces an electrostatic adherence force which causes the originals to adhere to the surface of the original supporting member. This has led to the difficulty with which the originals, especially thin originals of weak self-supporting strength, are conveyed on the original supporting member. For example, such an adverse effect has been particularly remarkable in automatic feeding devices which automatically feed sheet originals, and the electrostatic adherence force has caused oblique movement or stagnancy or jam of originals which has often resulted in not only reduced efficiency of copying but also breakage of originals themselves. Particularly, most originals are precious and important and usually, they are sole and therefore, even one of them must not be wrinkled or broken.

SUMMARY OF THE INVENTION

In view of these points, it is an object of the present invention to provide a copying apparatus having an improved and novel original feeding mechanism.

It is another object of the present invention to provide a copying apparatus having an original feeding mechanism which reduces the electrostatic adherence force caused during the feeding of originals, to thereby ensure smooth feeding of the originals.

It is still another object of the present invention to provide a copying apparatus having an original feeding mechanism which discharges an original supporting member from that side thereof opposite to the original supporting side of the original supporting member to thereby reduce the electrostatic adherence force.

The present invention consists of a copying apparatus having an original feeding mechanism for feeding originals by moving the originals on the surface of an original supporting member, characterized in that discharging means acts on the original supporting member from that side thereof opposite to the original supporting side of the original supporting member to discharge the original supporting surface.

Another embodiment of the present invention is a copying apparatus having an original feeding mechanism for feeding originals by moving the originals on the surface of an original supporting member, characterized in that discharging means is moved along the original supporting member while acting on the original supporting member from that side thereof opposite to the original supporting side in the portion of the original supporting member on which an original is not resting, to thereby discharge the original supporting surface.

Still another embodiment of the present invention is a copying apparatus having an original feeding mechanism for feeding originals by moving the originals on the surface of an original supporting member, characterized in that discharging means acts on the original supporting member from that side thereof opposite to the original supporting side of the original supporting member in synchronism with the movement of the originals moved on the original supporting member, while being held at a position between the originals being continuously conveyed, to thereby discharge the original supporting surface.

Yet still another embodiment of the present invention is a copying apparatus having an original feeding mechanism for feeding originals by moving the originals on the surface of an original supporting member, characterized in that discharging means is moved along the original supporting member with optical scanning means while acting on the original supporting member from that side thereof opposite to the original supporting side in the portion of the original supporting member on which an original is not resting, to thereby discharge the original supporting surface.

A further embodiment of the present invention is a copying apparatus having an original feeding mechanism for feeding originals by moving the originals on the surface of an original supporting member, characterized by main discharging means provided integrally with optical scanning means and imparting a discharging action to the original supporting member from that side thereof opposite to the original supporting side of the original supporting member in accordance with the movement of the optical scanning means, and auxiliary discharging means having one end supported on the body of the apparatus and the other end movable with the movement of the optical scanning means while imparting a discharging action to the original supporting member from that side thereof opposite to the original supporting side of the original supporting member at a forward position of movement of the optical scanning means.

With the above-described construction of the present invention, the electrostatic adherence force resulting from the friction charging caused during the original feeding, particularly, the automatic original feeding, is reduced to enable smooth feeding of originals.

The invention will become more fully apparent from the following detailed description thereof taken in conjunction with the accompanying drawings.

DESCRIPTION OF THE PREFERRED EMBODIMENTS

Embodiments of the present invention will hereinafter be described in detail with reference to the drawings.

Figure 1:
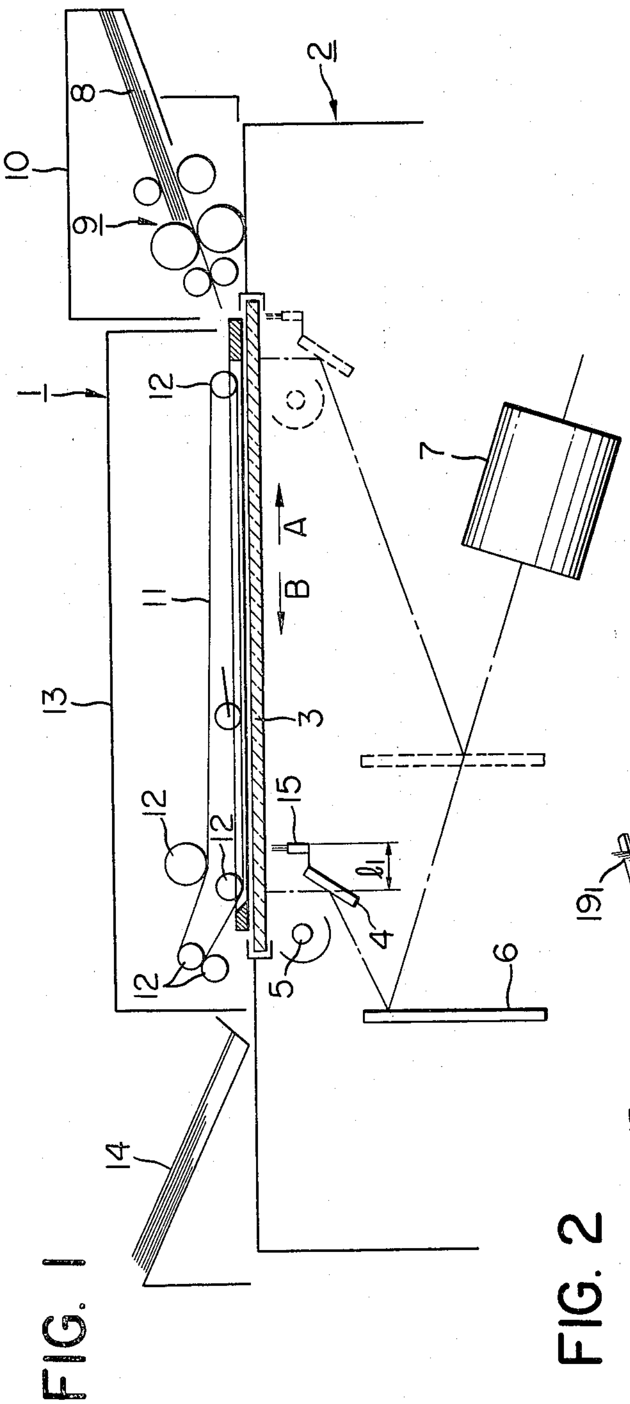
FIG. 1 is a cross-sectional view showing essential portions of a copying apparatus having the original feeding mechanism of the present invention.

Referring to FIG. 1 which is a cross-sectional view showing essential portions of a copying apparatus having the original feeding mechanism of the present invention, reference numeral 1 designates the original feeding mechanism portion and reference numeral 2 denotes the copying apparatus body side. The copying apparatus body side 2 has an original supporting member (glass plate) 3 used when the ordinary copying is effected, a first mirror 4 for scanning the glass plate 3, an illuminating lamp 5 movable with the first mirror 4, a second mirror 6 movable in the same direction as the first mirror 4 and at one-half of the velocity of the first mirror 4, and a lens 7 for causing the optical image of an original directed by these mirrors 4 and 6 to be formed on a photosensitive medium (not shown). The original feeding mechanism portion 1 comprises a feeder portion 10 in which originals 8 to be copied are piled, the feeder portion 10 having a separation and conveyance portion 9 for feeding the originals 8 one by one, a setting portion 13 for conveying the originals 8, fed from the feeder portion, to its position on the glass plate 3 by means of a conveyor belt 11 and a group of rollers 12 and stopping the originals 8 at such position, and a tray portion 14 for collecting the originals 8 discharged from the setting portion 13 after exposure has been terminated. The exposure of an original 8 to light is accomplished by moving the first and second mirrors 4 and 6 in the direction of arrow A in FIG. 1 so as to scan the original 8 resting on the glass plate 3 and, at this time, discharging means 15 provided at such a position so as not to interfere with the illuminating lamp 5 and optical system is moved in the direction of arrow with the mirrors 4 and 6. This movable discharging means 15 (such as, for example, a discharging needle) is held at a position spaced apart by a predetermined distance $l_1$ from the exposure opening portion in the scanning direction, and is moved therefrom. Simultaneously with the termination of the exposure scanning, the discharging means is moved in the direction of arrow B and at the same time, the original 8 is also moved on the glass plate 3 in the direction of arrow B, and the next original is subsequently fed from the feeder portion 10 with a predetermined space interval $l_2$ (greater than the aforementioned $l_1$) maintained between it and the preceding original, and is then stopped at a predetermined position in the setting portion 13.

During this series of movements, the discharging means 15 moved with the first and second mirrors 4 aand 6 is moved in the direction of arrow B while being held in the interval $l_2$ between the original 8 and the next original (namely, while holding a position delayed with respect to the trailing end of the original 8 but advanced with respect to the leading and of the next original), that is, the discharging means is moved while discharging the position whereat the original is not resting on the glass plate 3 (discharging action effected at the position whereat the original is resting on the glass plate 3 would not result in a great discharging effect), and it has empirically been found that this leads to a greatly increased discharging effect. This means that discharging should take place after an original has discharged and before the next original comes.

Figure 2:
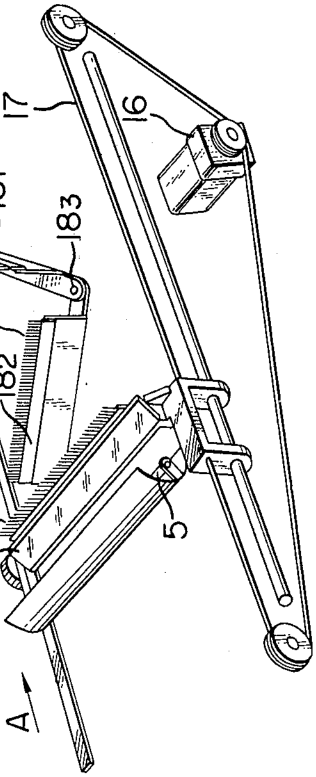
FIG. 2 is a perspective view showing essential portions of the optical system.

FIG. 2 is a perspective view showing essential portions of the optical system. The mirror 4 of the optical system is moved by a drive source 16 through a wire 17, and the discharging means 15 is moved in the direction of arrow A with the illuminating lamp 5. At this time, auxiliary discharging means $19_1$ and $19_2$ having one end $18_1$ rotatably supported on the body and the other end $18_2$ adapted to be moved in the direction of arrow A with the movement of the optical system are rotatably movable at a central portion $18_3$ therebetween. Thus, discharging of the area of the original supporting member opposite to the original supporting side thereof and forward of the scanning area of the optical system can be done prior to the scanning of the optical system.

Accordingly, even in cases other than full-size scanning, namely, even in the case of half-size scanning, discharging of the forward area of the optical scanning means (including the area in which the optical scanning is not effected) can be effected and therefore, even in a case where full-size scanning is effected after half-size scanning, the entire area is sufficiently discharged.

Alternatively, the discharging needle 15 may be designed such that when it has come from the right end to the forward end (left end) of the glass plate 3 as viewed in FIG. 1, its leftward movement is stopped by suitable means and the discharging needle 15 spring-charged in advance can be returned to its right or original position by the spring return force. Again in this case, the home position of the optical system lies at the left end as viewed in FIG. 1. That is, with the tendency of the copying toward higher speed, the discharge of an original from the setting portion 13 and the feeding of an original from the feeder portion 10 to the setting portion 13 take place substantially simultaneously with each other and it is often the case that there is an interval of the order of only 50 to 100 mm between the trailing end of a preceding original and the leading end of the next original and therefore, the discharging needle 15 is disposed within that interval (50–100 mm) and moved leftwardly substantially in synchronism with the movement of the original, whereby the discharging on the glass plate 3 is completed. The discharging needle 15 driven from the body through a clutch or the like is designed so as to move at a velocity substantially synchronous with the original being conveyed, and starts to move by the feed signal from the feeder portion 10 and discharges the glass plate 3 from the right thereof and when it has come to the left as viewed in FIG. 1, the clutch is disengaged by a suitable sensor such as a microswitch, whereupon the discharging needle 15 is reversed in movement by the charge force of the spring and returns to its home position (the right end in FIG. 1), thus waiting for the conveyance of the next original.

Again in this case, the optical system is moved from its left end position and returned to its left end or home position as viewed in FIG. 1. That is, only during the leftward movement of the optical system, is the discharging means moved together with such system and when the optical system has come back to its home position (the left end position in FIG. 1), the discharging means has returned to its right end position as viewed in FIG. 1. The discharging effected by the discharging means may be the normally practised high voltage discharging or the discharging by a discharging needle. In the present embodiment, the discharging means 15 (discharging needle) is co-operative with the optical scanning means (mirrors 4 and 6) and illuminating lamp 5, whereas another method having a discharging effect (which may be any method of effecting the discharging from that side opposite to the original supporting side) may also be adopted and the invention is not restricted to the present embodiment. However, according to the present embodiment, namely, according to the construction in which the discharging needle 15 is supported on the first mirror 4, for example, of the optical system, if the start position of the optical system is provided at the right end as viewed in FIG. 1 and design is made such that the feeder portion 10 is also driven upon starting of the movement of the optical system so as to feed the original 8, then the original will be immediately conveyed to and set at the portion of the glass plate 3 which has been discharged and therefore, even in a case where the exposure range of the optical system is not equal to the length of the glass surface (that is, a case where the exposure movement range is determined in accordance with the size of the copying medium), there will be an advantage that control can be effected without wasteful movement of the optical system, etc.

Also, by moving the discharging needle 15 with the first mirror 4 of the optical system, the original is in an attracted condition to the glass plate surface during each exposure scanning and no charge is generated and therefore, discharging cannot be expected, but if, even in a case where half-size scanning suffices during the last scanning cycle of a plurality of scanning cycles, scanning is effected to the full-size scanning position, namely, the right end of the glass plate 3, and thereafter the feeder portion 10 is driven, then a more sufficient discharging effect could be achieved.

What we claim is:

1. A copying apparatus having an original feeding mechanism having:

an original supporting member for supporting originals thereon;

original feeding means for conveying the originals onto the surface of said original supporting member;

discharging means for imparting a discharging action to said original supporting member from that side thereof opposite to the original supporting side of said original supporting member to discharge the surface of said original supporting member; and optical scanning means for optically scanning the original on said original supporting member.

2. A copying apparatus according to claim 1, wherein said discharging means is moved in synchronism with the movement of the original conveyed on said original supporting member, while being held at a position between said original and the next original.

3. A copying apparatus according to claim 1, wherein said discharging means is moved along said original supporting member while acting on the original supporting member from that side thereof opposite to the original supporting side of said original supporting member in the portion thereof on which the original is not resting, thereby discharging the original supporting surface.

4. A copying apparatus according to claim 1, wherein said discharging means is moved with said optical scanning means.

5. A copying apparatus according to claim 1, wherein said discharging means comprises main discharging means provided integrally with said optical scanning means, and auxiliary discharging means having one end supported on the body of said apparatus and the other end movable with the movement of said optical scanning means while imparting a discharging action to said original supporting member from that side thereof opposite to the original supporting side of said original supporting member at a forward position of movement of said optical scanning means.

* * * * *